United States Patent
Parks et al.

(10) Patent No.: US 11,872,988 B2
(45) Date of Patent: Jan. 16, 2024

(54) METHOD AND SYSTEM TO ADAPT OVERTAKE DECISION AND SCHEDULING BASED ON DRIVER ASSERTIONS

(71) Applicant: GM GLOBAL TECHNOLOGY OPERATIONS LLC, Detroit, MI (US)

(72) Inventors: Jeffrey S. Parks, Ann Arbor, MI (US); Namal P. Kumara, Ypsilanti, MI (US); Paul A. Adam, Milfod, MI (US); Gabriel T. Choi, Novi, MI (US); Michael J. Abowd, Ann Arbor, MI (US); Braden J. Swantick, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 679 days.

(21) Appl. No.: 17/094,507

(22) Filed: Nov. 10, 2020

(65) Prior Publication Data

US 2022/0144276 A1  May 12, 2022

(51) Int. Cl.
*B60W 30/18* (2012.01)
*B60W 30/16* (2020.01)
*B60W 50/08* (2020.01)
*B60W 30/14* (2006.01)

(52) U.S. Cl.
CPC .... *B60W 30/18163* (2013.01); *B60W 30/143* (2013.01); *B60W 30/162* (2013.01); *B60W 50/082* (2013.01); *B60W 2520/10* (2013.01); *B60W 2554/802* (2020.02)

(58) Field of Classification Search
CPC ......... B60W 30/18163; B60W 30/143; B60W 30/162; B60W 50/082; B60W 2520/10; B60W 2554/802; B60W 2540/18; B60W 2540/20; B60W 2554/804; B60W 2556/10; B60W 40/06; B60W 50/087
See application file for complete search history.

(56) References Cited

U.S. PATENT DOCUMENTS 6,107,939 A * 8/2000 Sorden .............. G01S 7/04
                                          340/901
2005/0273215 A1* 12/2005 Kuge ............. B60T 8/17551
                                            701/1

(Continued)

FOREIGN PATENT DOCUMENTS

JP  2004500279 A  * 1/2004

OTHER PUBLICATIONS

JP2004500279A machine translation (Year: 2004).*

*Primary Examiner* — Angelina Shudy
(74) *Attorney, Agent, or Firm* — Lorenz & Kopf, LLP

(57) ABSTRACT

In accordance with an exemplary embodiment, methods and systems are provided for controlling automatic overtake functionality for a host vehicle. In on such exemplary embodiment, a disclosed method includes: (i) obtaining, via a plurality of sensors, sensor data pertaining to the host vehicle and a roadway on which the host vehicle is traveling; (ii) determining, via a processor, when an automatic overtake is recommended, using the sensor data in conjunction with one or more threshold values; (iii) receiving driver inputs pertaining to the automatic overtake; and (iv) adjusting, via the processor, the one or more threshold values for the automatic overtake based on the driver inputs.

16 Claims, 7 Drawing Sheets

(56) References Cited

U.S. PATENT DOCUMENTS

| | | | | |
|---|---|---|---|---|
| 2012/0283927 | A1* | 11/2012 | Reinisch | B60T 7/22 |
| | | | | 701/70 |
| 2013/0272457 | A1* | 10/2013 | Ilie | H04L 1/0036 |
| | | | | 375/340 |
| 2014/0136015 | A1* | 5/2014 | Hayakawa | B60T 17/22 |
| | | | | 701/1 |
| 2015/0194055 | A1* | 7/2015 | Maass | G08G 1/096716 |
| | | | | 340/905 |
| 2015/0353094 | A1* | 12/2015 | Harda | B60W 30/18163 |
| | | | | 701/23 |
| 2016/0280265 | A1* | 9/2016 | Hass | B62D 15/0265 |
| 2017/0327120 | A1* | 11/2017 | Oh | B60W 50/082 |
| 2017/0371028 | A1* | 12/2017 | Laifenfeld | G01S 13/867 |
| 2019/0047621 | A1* | 2/2019 | Kim | G08G 1/167 |
| 2019/0061783 | A1* | 2/2019 | Jin | G08G 1/0112 |
| 2019/0226864 | A1* | 7/2019 | Miyazaki | B60W 40/09 |
| 2019/0265059 | A1* | 8/2019 | Warnick | G08G 1/20 |
| 2019/0315364 | A1* | 10/2019 | Kim | B60W 30/18163 |
| 2019/0329778 | A1* | 10/2019 | D'sa | B62D 15/0255 |
| 2019/0329779 | A1* | 10/2019 | D'sa | G06N 20/20 |
| 2019/0359215 | A1* | 11/2019 | Shimakage | G05D 1/0088 |
| 2020/0031335 | A1* | 1/2020 | Ohmura | B60W 50/082 |
| 2020/0047766 | A1* | 2/2020 | Ko | B60W 10/06 |
| 2020/0269844 | A1* | 8/2020 | Ishioka | B60W 10/20 |
| 2020/0307600 | A1* | 10/2020 | Sato | G08G 1/167 |
| 2021/0016778 | A1* | 1/2021 | Yashiro | B60W 10/04 |
| 2021/0380131 | A1* | 12/2021 | Parks | G06V 20/588 |
| 2022/0063607 | A1* | 3/2022 | Daniel | B60W 30/16 |
| 2022/0144269 | A1* | 5/2022 | Deborne | B60W 30/095 |
| 2022/0144276 | A1* | 5/2022 | Parks | B60W 50/082 |
| 2022/0176972 | A1* | 6/2022 | Miller | G08G 1/0125 |
| 2022/0340166 | A1* | 10/2022 | Kume | G08G 1/0962 |
| 2022/0348204 | A1* | 11/2022 | Wang | B60W 30/182 |
| 2022/0363258 | A1* | 11/2022 | Voigt | B60W 30/18163 |
| 2022/0382275 | A1* | 12/2022 | Martin | G06F 3/04847 |
| 2023/0099555 | A1* | 3/2023 | Zhang | B60W 40/09 |
| | | | | 701/41 |
| 2023/0192077 | A1* | 6/2023 | Tairbekov | B60W 30/0956 |
| | | | | 701/301 |

* cited by examiner

METHOD AND SYSTEM TO ADAPT OVERTAKE DECISION AND SCHEDULING BASED ON DRIVER ASSERTIONS

TECHNICAL FIELD

The present disclosure generally relates to vehicles, and more particularly relates to systems and methods for controlling automatic overtake decisions and scheduling for vehicles.

BACKGROUND

Certain vehicles have automatic overtake functionality, in which a computer system of the vehicle automatically initiates a lane change to overtake another vehicle along with a return the vehicle's present lane. However existing methods and systems may not always optimally implement such overtake functionality in certain situations.

Accordingly, it is desirable to provide systems and methods for controlling automatic overtake functionality. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for controlling automatic overtake functionality for a host vehicle, the method including: (i) obtaining, via a plurality of sensors, sensor data pertaining to the host vehicle and a roadway on which the host vehicle is traveling; (ii) determining, via a processor, when an automatic overtake is recommended, using the sensor data in conjunction with one or more threshold values; (iii) receiving driver inputs pertaining to the automatic overtake; and (iv) adjusting, via the processor, the one or more threshold values for the automatic overtake based on the driver inputs.

Also in an exemplary embodiment, the method further includes providing instructions, via the processor, for selectively executing the automatic overtake based on the adjusted one or more threshold values.

Also in an exemplary embodiment, the determining of when the automatic overtake is recommended is based on a relative velocity of one or more target vehicles in proximity to the host vehicle along with a driver set speed for the host vehicle.

Also in an exemplary embodiment, the adjusting of the one or more threshold values includes adjusting a threshold speed for one or more of the target vehicles based on the driver inputs.

Also in an exemplary embodiment, the adjusting of the one or more threshold values includes adjusting a timer for a delay between recommended overtake actions based on a driver override of one or more of the recommended overtake actions.

Also in an exemplary embodiment, the adjusting of the timer comprises: adjusting the timer based on an exponential short term adjustment in response to driver inputs during a current vehicle drive; and adjusting the timer based on a linear long term adjustment in response to driver inputs across multiple vehicle drives.

Also in an exemplary embodiment, the adjusting of the one or more threshold values includes: (i) increasing the one or more threshold values when a driver overrides a recommended overtake action; and (ii) decreasing the one or more threshold values when the driver initiates a manual request for an overtake action provide to the recommended overtake action.

Also in an exemplary embodiment, the adjusting of the one or more threshold values includes: (i) adjusting the one or more threshold values based on an exponential short term adjustment in response to driver inputs during a current vehicle drive; and (ii) adjusting the one or more threshold values based on a linear long term adjustment in response to driver inputs across multiple vehicle drives.

Also in an exemplary embodiment, the adjusting of the one or more threshold values includes providing a combined adjustment of the one or more threshold values via a summation of the short term adjustment with the long term adjustment.

Also in an exemplary embodiment, method further includes resetting the short term adjustment when an event occurs that is indicative of a roadway condition that is irrespective of a window between target vehicles in proximity to the vehicle.

In another exemplary embodiment, a system is provided for controlling automatic overtake functionality for a host vehicle, the system including: a plurality of sensors configured to obtain: sensor data pertaining to the host vehicle and a roadway on which the host vehicle is traveling; and driver inputs; and a processor coupled to the plurality of sensors and configured to at least facilitate: determining when an automatic overtake is recommended, using the sensor data in conjunction with one or more threshold values; and adjusting the one or more threshold values for the automatic overtake based on the driver inputs.

Also in an exemplary embodiment, the processor is configured to at least facilitate recommending the automatic overtake based on a relative velocity of one or more target vehicles in proximity to the host vehicle along with a driver set speed for the host vehicle.

Also in an exemplary embodiment, the processor is configured to at least facilitate adjusting a threshold speed for one or more of the target vehicles based on the driver inputs.

Also in an exemplary embodiment, the processor is configured to at least facilitate adjusting a timer for a delay between recommended overtake actions based on a driver override of one or more of the recommended overtake actions.

Also in an exemplary embodiment, the processor is configured to at least facilitate adjusting the timer based on an exponential short term adjustment in response to driver inputs during a current vehicle drive; and adjusting the timer based on a linear long term adjustment in response to driver inputs across multiple vehicle drives.

Also in an exemplary embodiment, the processor is configured to at least facilitate adjusting the one or more threshold values by: increasing the one or more threshold values when a driver overrides a recommended overtake action; and decreasing the one or more threshold values when the driver initiates a manual request for an overtake action provide to the recommended overtake action.

Also in an exemplary embodiment, the processor is configured to at least facilitate adjusting the one or more threshold values by: adjusting the one or more threshold values based on a short term geometric adjustment in response to driver inputs during a current vehicle drive; and adjusting the one or more threshold values based on a long term linear adjustment in response to driver inputs across multiple vehicle drives.

Also in an exemplary embodiment, the processor is configured to at least facilitate the adjusting of the one or more threshold values by providing a combined adjustment of the one or more threshold values via a summation of the short term adjustment with the long term adjustment.

Also in an exemplary embodiment, the processor is further configured to at least facilitate providing instructions for selectively executing the automatic overtake based on the adjusted one or more threshold values.

In another exemplary embodiment, a vehicle is provided that includes: a propulsion system; a steering system; a braking system; a plurality of sensors configured to obtain: sensor data pertaining to the host vehicle and a roadway on which the host vehicle is traveling; and driver inputs; and a processor coupled to the plurality of sensors and configured to at least facilitate: determining when an automatic overtake is recommended, using the sensor data in conjunction with one or more threshold values; adjusting the one or more threshold values for the automatic overtake based on the driver inputs; and providing instructions for the propulsion system, the steering system, and the braking system for selectively executing the automatic overtake based on the adjusted one or more threshold values.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
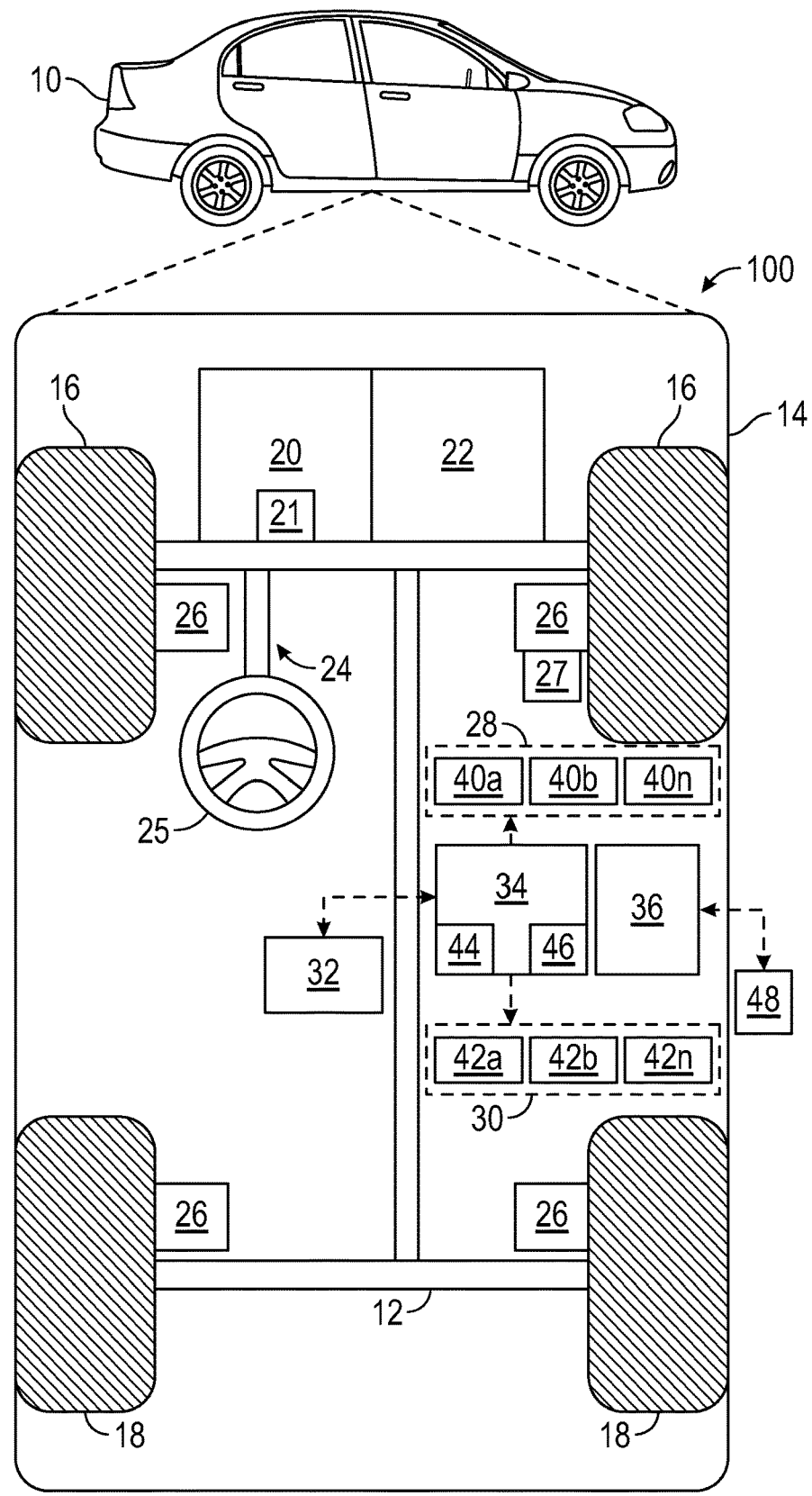
FIG. 1 is a functional block diagram illustrating a vehicle with a system for controlling automatic overtake functionality, in accordance with an exemplary embodiment.

With reference to FIG. 1, an automatic overtake control system 100 shown generally as 100 is associated with a vehicle 10 (also referred to as the "host "vehicle" 10) in accordance with various embodiments. In general, the automatic overtake control system (or simply "system") 100 provides for control of automatic overtake functionality for the vehicle 10, including automatic passing of another vehicle in the same lane of the host vehicle 10 and return to the lane in which the vehicle 10 is traveling, which are customized based on driver assertions to individualize the automatic overtake functionality of the vehicle 100.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. While an automotive vehicle is depicted in FIG. 1, it will be appreciated that in certain embodiments the vehicle 10 may comprise any number of other types of vehicles and/or one or more other types of mobile platforms.

In various embodiments, the automatic overtake control system 100, and/or components thereof, are incorporated into the vehicle 10. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36.

The propulsion system 20 may, in various embodiments, include an internal combustion engine, an electric machine such as a traction motor, and/or a fuel cell propulsion system. In various embodiments, the propulsion system 20 has or is coupled to an accelerator pedal 21 for a driver to provide manual acceleration inputs for the propulsion system 20 for proving acceleration for the vehicle 10.

The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative brake system such as an electric machine, and/or other appropriate brake systems. In various embodiments, the brake system 26 includes a brake pedal 27 for a driver to provide manual braking inputs for the brake system 26.

The steering system 24 influences a position of the vehicle wheels 16 and/or 18. In various embodiments, the steering system 24 includes a steering wheel 25 for a driver to provide manual steering inputs for the steering system 24.

The sensor system 28 includes one or more sensing devices 40a-40n that sense observable conditions of the exterior environment and/or the interior environment of the vehicle 10. The sensing devices 40a-40n might include, but are not limited to, radar sensors (e.g., including front and rear short range and long range radar), cameras (e.g., including front view and rear view cameras), global positioning systems and navigation sensors, side blind zone sensors, speed sensors (e.g. wheel speed sensors, accelerometers, or the like used for calculating vehicle speeds), lidars, brake pedal sensors, steering wheel sensors, accelerator pedal sensors, and/or other sensors. The actuator system 30 includes one or more actuator devices 42a-42n that control one or more vehicle features of the vehicle 10. In various embodiments, the actuator devices 42a-42n (also referred to as the actuators 42) control one or more features such as, but not limited to, the propulsion system 20, the transmission system 22, the steering system 24, and the brake system 26. In various embodiments, vehicle 10 may also include interior and/or exterior vehicle features not illustrated in FIG. 1, such as a trunk, and cabin features such as air, music, lighting, touch-screen display components (such as those used in connection with navigation systems), and the like.

The data storage device 32 stores data for use in automatically controlling the vehicle 10 and for controlling automatic overtake and customizing automatic overtake functionality based on driver assertions for the vehicle 10.

In addition, in various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores data pertaining to roadways on which the vehicle 10 may be traveling. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10 and in controlling and customizing automatic overtake functionality for the vehicle 10.

In various embodiments, the processor 44 provides, controls, and customizes automatic overtake functionality for the vehicle 10 based on assertions for the driver, for example as described in greater detail further below in accordance with the control process 300 of FIG. 3.

The instructions for the processor 44 may include one or more separate programs, each of which comprises an ordered listing of executable instructions for implementing logical functions. The instructions, when executed by the processor 44, receive and process signals from the sensor system 28, perform logic, calculations, methods and/or algorithms for controlling the automatic overtake functionality as well as for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In one embodiment, as discussed in detail below, the controller 34 is configured for use in controlling automatic overtake functionality for the vehicle 10.

The communication system 36 is configured to wirelessly communicate information to and from other entities 48, such as but not limited to, other vehicles ("V2V" communication), infrastructure ("V2I" communication), transportation systems, and/or user devices. In an exemplary embodiment, the communication system 36 is a wireless communication system configured to communicate via a wireless local area network (WLAN) using IEEE 702.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
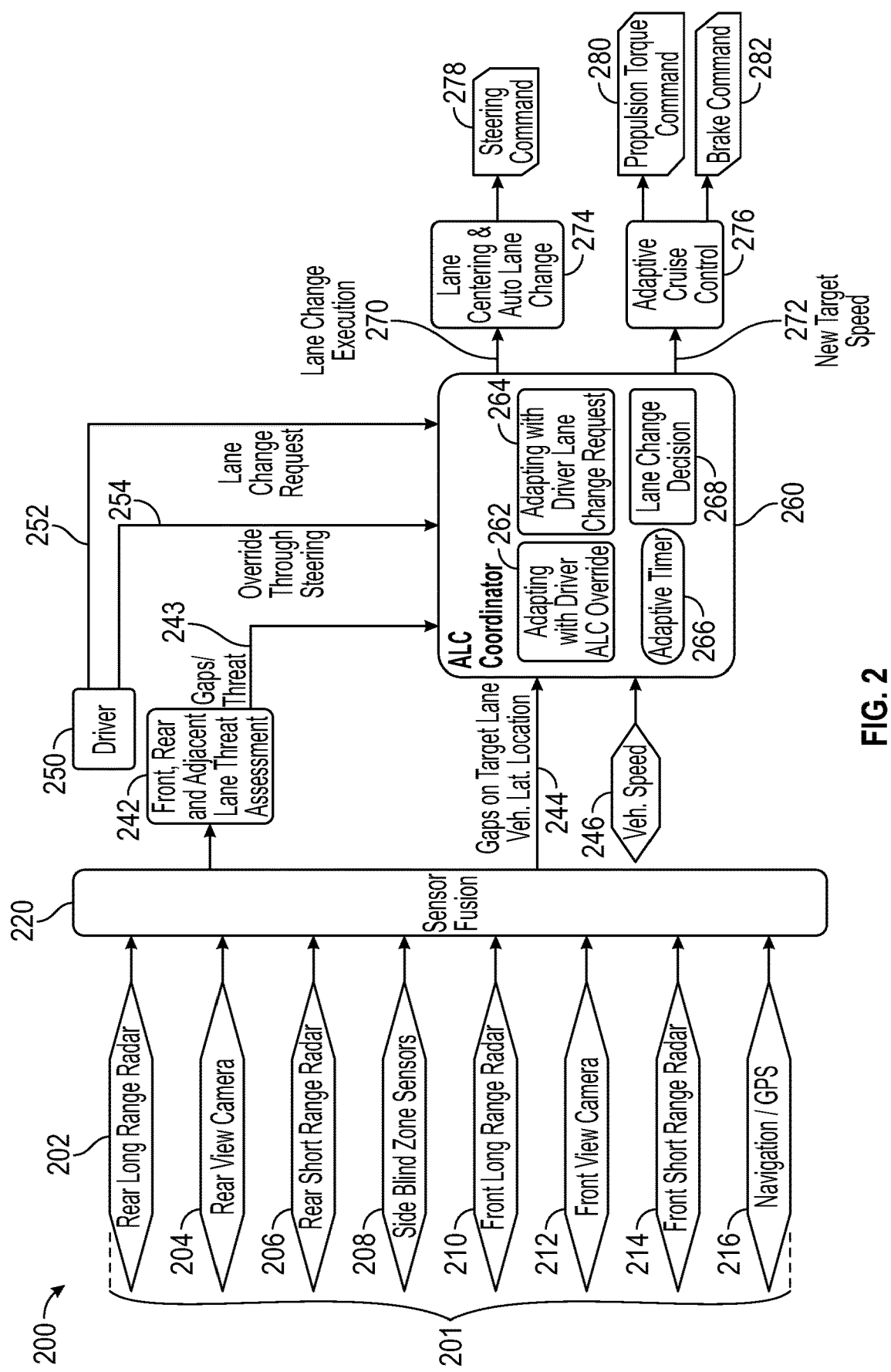
FIG. 2 is a dataflow diagram illustrating an automatic overtake control system for vehicles, in accordance with an exemplary embodiment.

FIG. 2 is a dataflow diagram illustrating an automatic overtake control system flow 200 for vehicles, in accordance with an exemplary embodiment. In various embodiments, the automatic overtake control system flow 200 can be implemented in connection with the vehicle 10, including the control system 100 thereof.

As depicted in FIG. 2, in various embodiments, sensor data 201 is obtained. In various embodiments, the sensor data 201 is obtained from the sensing devices 40 of the sensor system 28 of the control system 100 of the vehicle 10 of FIG. 1. As depicted in FIG. 2, in various embodiments, the sensor data 201 includes rear long range sensor data 202, rear view camera data 204, rear short range radar data 204, side blind zone sensor data 208, front long range radar data 210, front view camera data 212, front short range radar data 214, and navigation and/or GPS data 216.

In various embodiment, the sensor data 201 is taken with respect to the vehicle 10 and its surrounding environments, including a roadway on which the host vehicle 10 is traveling, and including other vehicles in proximity to the host vehicle 10.

Also in various embodiments, the sensor data of 201 is fused together via data fusion 202. In various embodiments, this is performed by the processor 44 of FIG. 1.

In addition, in various embodiments, front, rear, and adjacent lane threat assessments 242 are determined. In various embodiments, these assessments are made by the processor 44 of FIG. 1, using the sensor fusion 220 of the sensor data 201. Also in various embodiments, gaps and/or threats 243 for the vehicle 10 (e.g., with respect to surrounding vehicles and the prospects of overtaking such other vehicles) are determined by the processor 44 based on the assessments 242.

In addition, in various embodiments, gaps on target lane vehicle lateral location 244 are also determined by the processor 44, based on the sensor fusion 220 of the sensor data 201.

Also in various embodiments, vehicle speeds 246 are also determined by the processor 44 based on the sensor fusion 220 of the sensor data 201. For example, in various embodiments, the processor 44 determines a speed of the host vehicle 10 based on one or more sensor values (e.g., as obtained from wheel speed sensors, accelerometers, and/or one or more other sensors), and also obtains sensor-based speed values for other vehicles that may be in proximity to the host vehicle 10 (e.g., in the same lane as the host vehicle 10, or in a lane that is adjacent to the lane of the host vehicle 10).

In addition, in various embodiments, inputs from a driver 250 of the vehicle 10 are monitored, including lane change requests 252 and override through steering 254 from the driver. In various embodiments, as described in greater detail below, such driver inputs are utilized in customizing and tailoring the automatic overtake functionality based on driver assertions, as expressed through the driver inputs.

In various embodiments, an automatic lane change controller 260 (e.g., comprising, including, and/or coupled to the processor 44 of FIG. 1) receives inputs that include the gaps/threats 243, the gaps on target lane vehicle lateral location 244, vehicle speeds 246, driver lane change requests 252, and driver override through steering 254, and generates both a lane centering and automatic lane change result 274 (in combination also with a lane change execution 270 based on the driver lane change request 252), as well as an adaptive cruise control result 276.

In various embodiments, the automatic lane change results 274 is used by the processor 44 in generating a steering command 278 (e.g., that is implemented via the actuator system 30 in conjunction with the steering system 24 of FIG. 1). Also in various embodiments, the adaptive cruise control result 276 is used by the processor 44 in generating a propulsion torque command 280 (e.g., that is implemented via the actuator system 30 in conjunction with the propulsion system 20 of FIG. 1), as well as a brake command 282 (e.g., that is implemented via the actuator system 30 in conjunction with the brake system 26 of FIG. 1).

In various embodiments, the automatic overtake control system flow 200 is implemented in connection with the control process 300 of FIG. 3, which is described below in connection therewith, and in accordance with the implementations of FIGS. 4-9.

Figure 3:
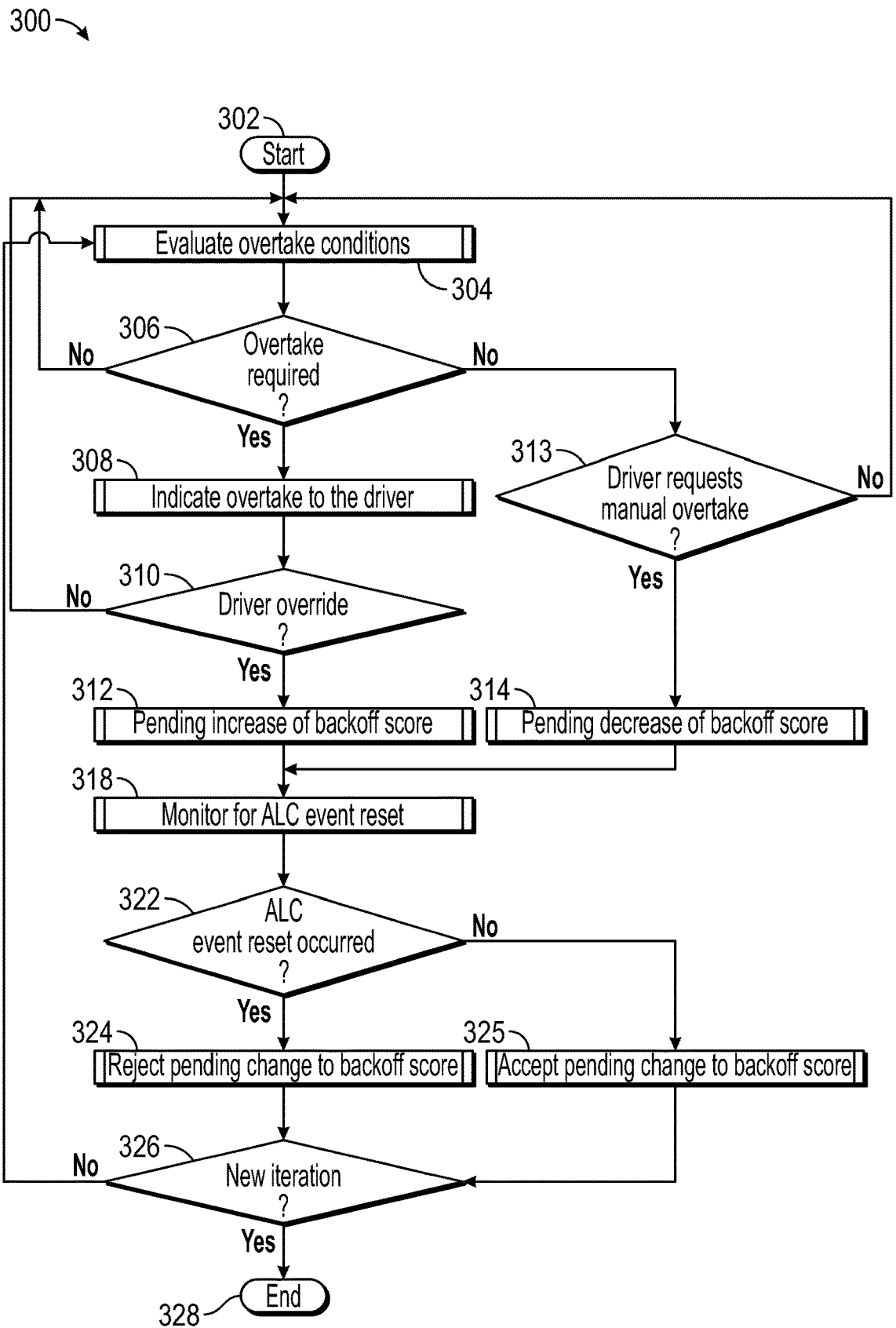
FIG. 3 is a flowchart for a control process for controlling automatic overtake functionality for a vehicle, such as the vehicle of FIG. 1, in accordance with an exemplary embodiment.

FIG. 3 is a flowchart for a control process 300 for controlling automatic overtake functionality for a vehicle, in accordance with an exemplary embodiment. In various embodiments, the control process 300 of FIG. 3 may be implemented in connection with the vehicle 10 (including the control system 100 thereof) of FIG. 1 and the automatic overtake control system flow 200 of FIG. 2. In addition, in various embodiments, the control process 300 of FIG. 3 may also be implemented in connection with the various exemplary implementations of FIGS. 4-9, described below.

As depicted in FIG. 3, in various embodiments, the control process 300 begins at 302. In various embodiments, the control process 300 begins when a driver enters the vehicle 10 and/or turns the vehicle 10 on, and/or begins a vehicle drive using the vehicle 10. Also in various embodiments, the control process 300 continues throughout the vehicle drive.

In various embodiments, overtake conditions are evaluated at 304. In various embodiments, the processor 44 of FIG. 1 makes evaluations based on the host vehicle 10 potentially automatically overcoming one or more other vehicles that may be traveling in front of the host vehicle 10. In various embodiments, the evaluations are made using sensor data from the sensing devices 40 of FIG. 1.

Figure 4:
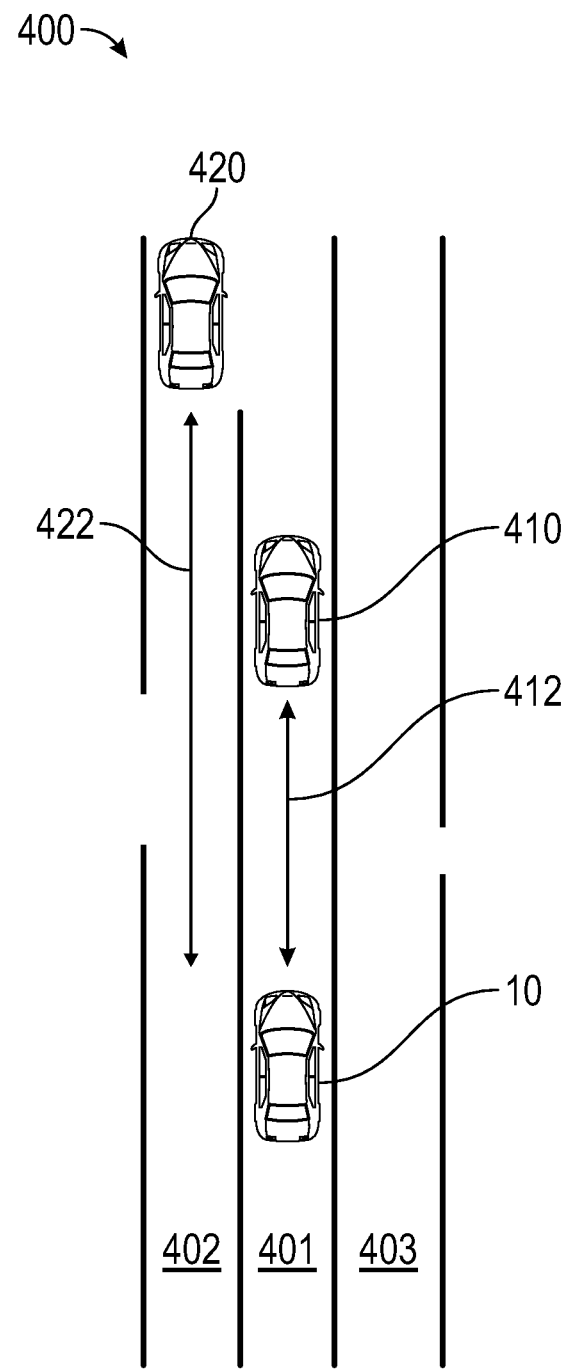
FIG. 4 provides an illustration of a host vehicle overtaking another vehicle on a roadway in accordance with the control process of FIG. 3, in accordance with an exemplary embodiment.

With reference to FIG. 4, an illustration is provided of a roadway 400 that includes a host vehicle 10 (e.g., corresponding to the vehicle 10 of FIG. 1) in proximity to other vehicles on the roadway 400 relevant to automatic overtaking functionality for the host vehicle 10, in accordance with an exemplary embodiment.

As depicted in FIG. 4, the host vehicle 10 is depicted in a first lane 401 of the roadway 400, in accordance with an exemplary embodiment. In this embodiment, the first lane 401 includes adjacent lanes, including an adjacent left lane 402 and an adjacent right lane 403. Also as depicted in FIG. 4, in this example, a first target vehicle 410 is disposed directly in front of the host vehicle 10 in the same (first) lane 401. In addition, as depicted in FIG. 4, a second target vehicle 420 is disposed in front of the host vehicle 10 in the adjacent left lane 402.

As depicted in FIG. 4, in this exemplary embodiment, the host vehicle 10 may potentially overtake (i.e., pass) the first target vehicle 410 while avoiding contact with both the first target vehicle 4210 and the second target vehicle 420. In addition, as depicted in FIG. 4, the potential automatic overtaking of the first target vehicle 410 is based at least in part on determinations of sensor data that include a first distance 412 between the host vehicle 10 and the first target vehicle 410 (e.g., the distance to the closest in path vehicle to the host vehicle 10) as well as a second distance 422 between the host vehicle 10 and the second target vehicle 420 (e.g., the distance to the closest left target to the host vehicle 10). Also in various embodiments, the potential automatic overtaking of the first target vehicle 410 is also based on relative velocities of the first target vehicle 410 and the second target vehicle 420 with respect to the host vehicle 10.

With reference back to FIG. 3, in various embodiments, a determination is made at 306 as to whether vehicle overtake is required. Specifically, in various embodiments, the processor 44 of FIG. 1 determines whether an overtake (e.g., passing) of the first target vehicle 410 by the host vehicle 10 is required (and/or desired), based on various data that includes the first and second distances 412, 422 of FIG. 4 between the host vehicle 10 and the first and second target vehicles 410, 420, as well as the relative velocities of the first and second target vehicles 410, 420 with respect to the host vehicle 10.

Figure 5:
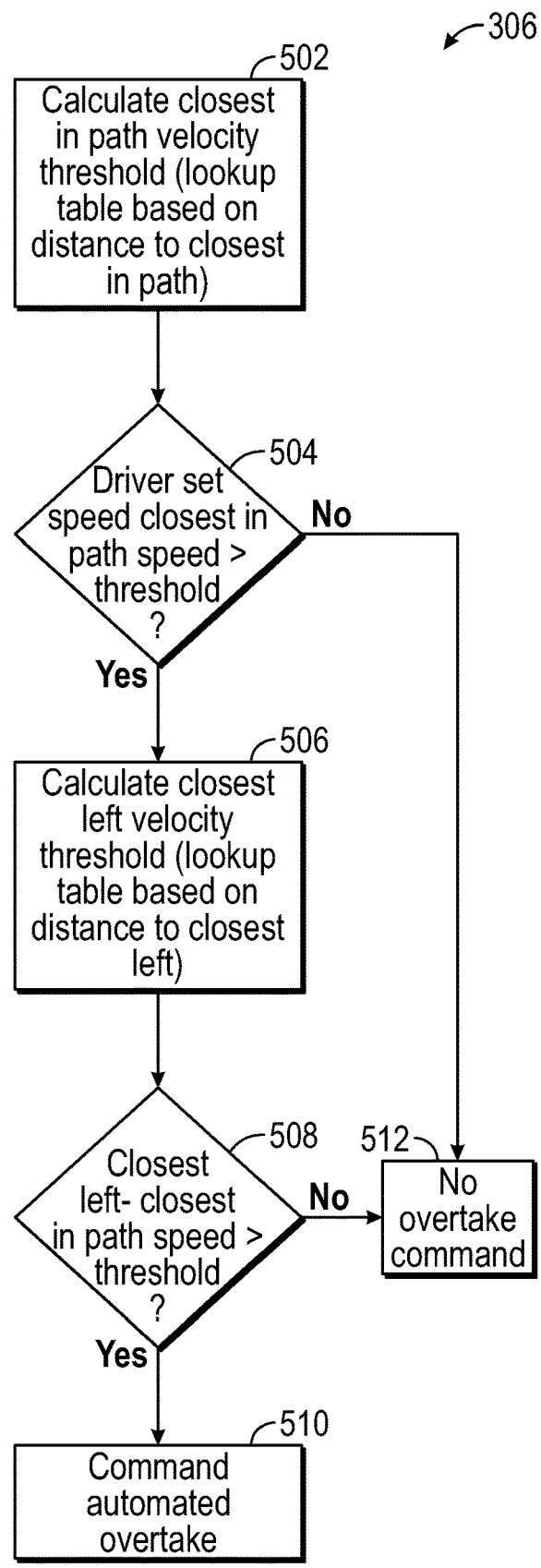
FIG. 5 is a flowchart of a sub-process of the control process of FIG. 3, namely, the sub-process of determining whether an overtake of another vehicle is required, in accordance with an exemplary embodiment.

With reference to FIG. 5, a flowchart is provided with respect to a sub-process corresponding to the step 306 of determining whether a vehicle overtake is required, in accordance with an exemplary embodiment.

As depicted in FIG. 5, in an exemplary embodiment, a closest in path distance and/or velocity threshold is calculated at 502. In various embodiments, the closest in path distance and/or velocity threshold is calculated by the processor 44 of FIG. 4 for a look-up table (or, in some embodiments, a function and/or other mathematical construct) based on the first distance 412 of FIG. 4 (i.e., the closest in path distance) along with the relative velocity of the first target vehicle 410 of FIG. 4 (i.e., the closest target vehicle in front of the host vehicle 10 in the same lane 401 and the host vehicle 10). In certain embodiments, the look-up table uses the velocity as an input and a distance threshold as an output. In certain other embodiments, the look-up table calculates the velocity as an output.

In various embodiments, the velocity threshold is an output of the lookup table. Also in various embodiments, a difference between the driver's chosen set speed and an absolute velocity of the closest in path target vehicle (e.g., the first target vehicle 410 of FIG. 1) is calculated in accordance with the following equation:

$$Vx\_Diff = DriverSetSpeed - (Velocity\ of\ Host + CIP\ Relative\ Velocity) \quad \text{(Equation 1)},$$

in which Vx_Diff represents the velocity difference, DriverSetSpeed represents the driver's selected speed (e.g., for cruise control for the host vehicle 10), and CIP Relative Velocity represents the relative velocity between the closest in path target vehicle (e.g., the first target vehicle 410 of FIG. 1) in the same lane as the host vehicle 10.

Also in various embodiments, at step 504, a driver set speed is determined (e.g., based on driver inputs for cruise control functionality of the vehicle 10), and a determination is made as to whether a difference between the driver set speed and the closest in path speed in greater than a first predetermined threshold. Specifically, in certain embodiments, the processor 44 of FIG. 1 makes a determination by subtracting the absolute speed of the first target vehicle 410 of FIG. 4 (i.e., the closest target vehicle in front of the host vehicle 10 and in the same lane 401 thereof) from the driver set speed (e.g., for the cruise control functionality), and comparing this mathematical difference with the predetermined threshold from step 502.

For example, in one example in which the Driver Set Speed is equal to seventy miles per hour (70 mph) and the Actual Host Vehicle Speed is equal to sixty five miles per hour (65 mph) and the CIP Relative Velocity is equal to negative one (−1), the difference would be calculated as follows:

$$VxDiff = 70 - (65 + -1) = 6\ mph \quad \text{(Equation 2)}.$$

If it is determined in step 504 that the mathematical difference of step 504 is less than or equal to the predetermined threshold from step 502, then it is determined that an overtaking of the first target vehicle 410 is not required (or desired), and accordingly no overtake command is generated (step 512).

Conversely, if it is instead determined at step 504 that the mathematical difference of step 504 is greater than the predetermined threshold from step 502, then it is determined that the process proceeds instead to step 506, described directly below.

In an exemplary embodiment, during step 506, the closest left-closest in path distance and/or velocity threshold is calculated by the processor 44 of FIG. 4 using a look-up table (or, in some embodiments, a function and/or other mathematical construct) based on the second distance 422 of FIG. 4 (i.e., the distance to the closest left target) along with the relative velocity of the second target vehicle 420 of FIG. 4 (i.e., the closest target vehicle in front of the host vehicle 10 in the adjacent left lane 402).

Also in various embodiments, at step 508, a determination is made as to whether the relative speed of the closest left target vehicle (i.e. the second target vehicle 420 of FIG. 4) with respect to the closest in path target vehicle (i.e., the first target vehicle 410 of FIG. 1) is greater than a second predetermined threshold. Specifically, in certain embodiments, the processor 44 of FIG. 1 makes a determination by comparing the relative speed of the second target vehicle 420 (with respect the first target vehicle 410) against the predetermined threshold from step 506.

In certain embodiment, this determination uses the following calculation:

$$LtLn\_VxDiff = \text{Relative Velocity Left Target} - \text{Relative Velocity CIP} \quad \text{(Equation 3)},$$

in which LtLn_VxDiff represents the relative velocity of the second target vehicle 420 with respect to the first target vehicle 410, the Relative Velocity Left Target represents the relative velocity of the second target vehicle 420 with respect to the host vehicle 10, first target vehicle 410, and the Relative Velocity CIP represents the relatively velocity of the first target vehicle 410 with respect to the host vehicle 10. In various embodiments, the Relative Velocity Left Target and the Relative Velocity CIP are measurements made by the sensors 40 of FIG. 1 (e.g., radar, cameras) and are fused together. Also in various embodiments, the LtLn_VxDiff is calculated thereof in accordance with Equation 3. In certain embodiments, the input for the look-up table for this step is the VxDiff, and the output is a distance threshold.

If it is determined in step 508 that the relative speed of the second target vehicle 420 with respect to the first target vehicle 410 is less than or equal to the predetermined threshold from step 506, then it is determined that an overtaking of the first target vehicle 410 is not required (or desired), and accordingly no overtake command is generated (proceeding to the above-described step 512).

Conversely, if it is instead determined at step 508 that the relative speed of the second target vehicle 420 with respect to the first target vehicle 410 is greater than the predetermined threshold from step 506, then it is determined that the automatic overtaking of the first target vehicle 410 is required (and/or desired), and a command is provided by the processor 44 to provide the automated overtaking of the first target vehicle 410 by the host vehicle (10) at step 510 (e.g., with the command implemented by the actuator system 30, propulsion system 20, steering system 24, and brake system 26 of FIG. 1).

With reference back to FIG. 3, in an exemplary embodiment, if it is determined at step 306 that an overtake is not required, then the process returns to step 313, described below. In addition, in certain embodiments, the process may simultaneously return to step 304 in a new iteration.

When it is determined in an iteration of step 306 that an overtake is required, in various embodiments, a notification is provided for the driver indicating that an automatic overtake is scheduled to take place (step 308). In various embodiments, one or more audio, visual, and/or haptic notifications are provided for the driver via instructions provided by the processor 44 (e.g., via one or more audio, visual, and/or haptic displays) indicted the scheduled automatic overtake.

Also in various embodiments, during step 310, manual inputs are received from the driver of the host vehicle 10, and a determination is made based on the manual inputs as to whether a driver override is expressed. In various embodiments, this determination is made by the processor 44 based on the sensor data (including sensor data monitoring inputs from the driver).

In various embodiments, if it is determined at step 310 that a driver override is not detected, then the process returns to step 304 in a new iteration.

Conversely, in various embodiments, if it is determined that a driver override is detected, then a back off score for the automated overtake functionality is increased (step 312). In various embodiments, this is performed by the processor 44 of FIG. 1, for example as an indication that the current scheduling of the automatic overtake may be too aggressive for the preferences of this particular driver (and, for example, such that future scheduled automatic overtakes may be more conservative in nature, for example requiring relatively larger passing windows between the first and second target vehicle 410, 420 of FIG. 4).

In various embodiments, during step 312, the back off score is increased by increasing a relative velocity threshold between one or more of the target vehicles 410, 420 and the host vehicle 10, in order to require a relatively larger passing window for the host vehicle 10 between the first and second target vehicles 410, 420.

In addition, also in various embodiments during step 312, a timer is also increased with respect to scheduling automated overtakes for the host vehicle 10. For example, in various embodiments, when a driver override of a scheduled automated overtake is made by the driver, then the process utilizes a timer for timed delays before subsequent scheduling of automated overtakes for the host vehicle 12. In various embodiments, such timed delays increase with each driver override.

Figure 6:
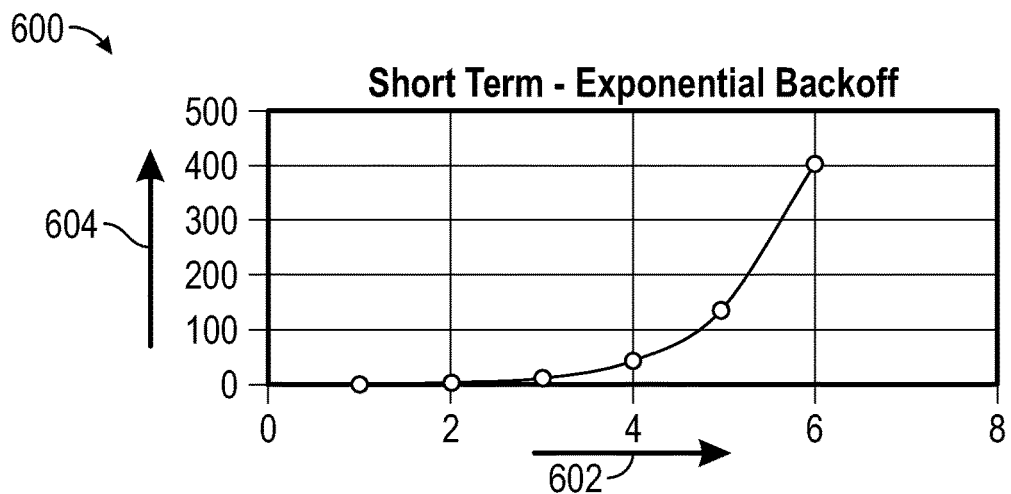
FIGS. 6-8 provide graphical illustrations of exemplary implementations of an automatic lane change timer pursuant to the control process of FIG. 3, in accordance with an exemplary embodiment.
Figure 7:
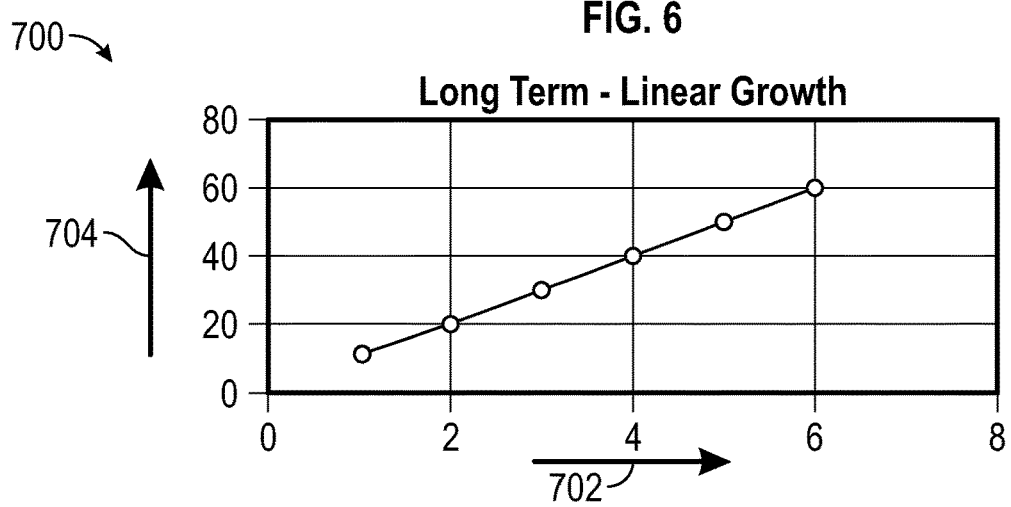
Figure 8:
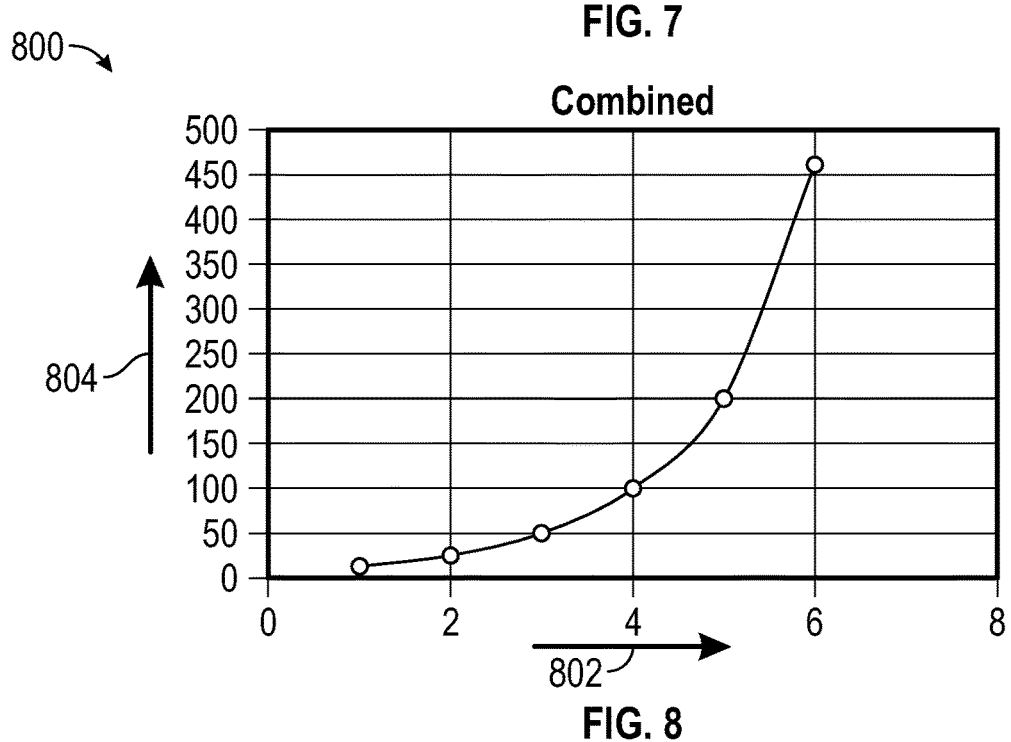

For example, with reference to FIGS. 6-8, graphical illustrations are provided of exemplary implementations of an automatic lane change timer following driver overrides in iterations of step 310 of FIG. 3, in accordance with exemplary embodiments. Specifically, in accordance with exemplary embodiments: (i) FIG. 6 provides a first graphical representation 600 of short term adjustments in a timer delay between automated overtake recommendations (represented in seconds along y-axis 604) in response to a number of repeated driver overrides (represented in number of repeated overrides along x-axis 602); (ii) FIG. 7 provides a second graphical representation 700 of long term adjustments in a timer delay between automated overtake recommendations (represented in seconds along y-axis 704) in response to a number of repeated driver overrides (represented in number of repeated overrides along x-axis 702); and (iii) FIG. 8 provides a third graphical representation 800 of combined adjustments in a timer delay between automated overtake recommendations (represented in seconds along y-axis 804) in response to a number of repeated driver overrides (represented in number of repeated overrides along x-axis 802).

As shown in FIG. 6, in various embodiments, a short term adjustment in the timer represents exponential back off of subsequent automated overtake recommendations. In certain embodiments, this represents a short term situation, for example, during current, single vehicle drive. As represented in FIG. 6, in various embodiments, during such a short time period, for each driver override during a current vehicle drive, the timer delay before recommending a subsequent automated overtake becomes increasingly greater with each subsequent driver override (representing an exponential function as depicted in FIG. 6). In various embodiments, this is performed to minimize annoyance to the driver in the short term (e.g., during a current vehicle drive, in which there may be particular circumstances, for example pertaining to the roadway, which may differ from a typical vehicle drive).

Additionally, in certain embodiments, the exponential back off is accomplished via a lookup table. In certain embodiments, the number of driver overrides is counted, and the back off is based on the number of driver overrides. In various embodiments, the number of subsequent driver overrides are also counted. In certain embodiments, the first driver override results in the back off set to the first value in the lookup table, and the second subsequent override proceeds then to the second value in the lookup table, and so on. In various embodiments, the lookup table is calibrated to provide an exponential function. However, in certain other embodiments, the lookup table is calibrated to instead provide one or more other functions and/or other relationships, such as a linear growth or a flat timer value, and so on.

Also in various embodiments, the counter for the number of driver overrides is reset if there is a successful ALC automatic lane change, or if the driver commands a lane change on demand, the driver steers for a manual lane change, or if the driver disables the lane following feature.

As shown in FIG. 7, in various embodiments, a long term adjustment in the timer represents a linear back off of subsequent automated overtake recommendations. In certain embodiments, this represents a long term situation, for example, among a large number of different vehicle drives. As represented in FIG. 7, in various embodiments, for such a long time period, for each driver override during a large number of different vehicle drives, the timer delay before recommending a subsequent automated overtake is constant over the long run (representing a linear function as depicted in FIG. 7). In various embodiments, this is performed to maximize the tailoring of the automatic overtake functionality to meet the specific preferences of the driver over a long period of time over a number of different situations for the roadway among a large number of different vehicle drives.

As shown in FIG. 8, in various embodiments, a combined adjustment in the timer is utilized over both the short and long terms. In various embodiments, the combined adjustment of FIG. 8 represents a sum of the short term effects of the adjustments of FIG. 6 with the long term adjustments of FIG. 7, for example to provide a smoothing of effects therebetween.

With reference back to FIG. 3, in various embodiments, following step 312, the process proceeds to step 318, described further below.

With reference back to step 306 of FIG. 3, if it is determined at step 306 that an overtake is not required, then the proceeds to step 313. During step 313, a determination is made as to whether a driver initiated overtake has occurred. Specifically, in various embodiments, a driver initiated overtake occurs when a driver initiates a manual vehicle overtake (or a manual request for a vehicle overtake) prior to a notification of an automated vehicle overtake, as determined by the processor 44. In certain embodiments, step 313 is performed in parallel with step 310.

In various embodiments, if it is determined at step 313 that a driver has not requested a manual overtake, then the process returns to step 304 in a new iteration.

Conversely, in various embodiments, when a driver initiated overtake is determined to have occurred in step 313, then the back off score for the automated overtake functionality is decreased (step 314). In various embodiments, this is performed by the processor 44 of FIG. 1, for example as an indication that the current scheduling of the automatic overtake may be not aggressive enough for the preferences of this particular driver (and, for example, such that future scheduled automatic overtakes may be more aggressive in nature, for example justified with relatively smaller passing windows between the first and second target vehicle 410, 420 of FIG. 4). In various embodiments, the decrease of the back off score follows a linear curve in the long term, similar to (but in the opposite direction of) FIG. 7 described above. Also in various embodiments, if it is determined in step 313 that a driver initiated overtake has not occurred, then the back off score is unchanged.

In various embodiments, the process then proceeds to step 318, described below.

With reference to both steps 312 and 314, in various embodiments, a temporary change is made to the back off score based on the adjustments (if any) of steps 312 and/or 314. In various embodiments, the temporary change may subsequently either be (i) be disposed of (when an automated lane change event occurs), or (ii) accepted and made permanent (when no automated lane change event occurs). In various embodiments, the temporary change to the back off score is maintained based on whether an ALC (automated lane change) event occurs. Specifically, as described in greater detail further below, when such an event occurs, the temporary change is disposed of Conversely, when no such events occur, the temporary change to the back off score is accepted, and becomes permanent.

In certain embodiments, steps 310-314 are also performed with respect to driver overrides of the automated return to of the host vehicle 10 to its home lane. Specifically, in certain embodiments, steps 310-314 are also performed in the same manner, but in an opposite direction, with respect to the driver's override of the control system 100's automatic return of the host vehicle 10 to its lane 401 of FIG. 4 after overtaking (e.g., passing) the first target vehicle 410 of FIG. 4. For example, in certain embodiments, when the driver overrides the planned automatic return of the host vehicle 10 back to its lane 401 of FIG. 4 after passing the first target vehicle 410 of FIG. 4, the process construes this as a driver assertion that the driver would like for the host vehicle 10 to remain in the left lane 402 for a relatively longer period of time after passing the first target vehicle 410 in those situations in the future, and then the thresholds are adjusted accordingly to accomplish this. Conversely, also in certain embodiments, when the driver initiates a manual return of the host vehicle 10 back to its lane 401 of FIG. 4 after passing the first target vehicle 410 of FIG. 4 before the automatic return to the lane 401 via the control system 100, the process construes this as a driver assertion that the driver would like for the host vehicle 10 to return to the original lane 401 after a relatively shorter period of time after passing the first target vehicle 410 in those situations in the future, and then the thresholds are adjusted accordingly to accomplish this.

In certain embodiments, the adjustment is made in this step is to the VxDiff threshold for the Right Front Vehicle (e.g., the first target vehicle 410 of FIG. 1, in accordance with the following:

$$\text{Right Lane VxDiff} = \text{Rt Ln Obj Absolute Speed} - \text{Driver Set Speed} \quad \text{(Equation 4)},$$

calculated as follows:

$$\text{RtLn\_VxDiff} = \text{Host } Vx + \text{RtLn Obj Relative } Vx - \text{Driver Set Speed} \quad \text{(Equation 5)},$$

in which Rt Ln_VxDiff represents the relative velocity of the first target vehicle 410 with respect to the driver selected set speed, Rt Ln Obj Absolute Speed represents an absolute speed of the first target vehicle 410 of FIG. 4, Driver Set Speed represents a speed set by the driver of the host vehicle 10 (e.g., for cruise control), Host Vx represents a velocity of the host vehicle 10, and RtLn Obj Relative Vx represents a relative velocity between the first target vehicle 410 of FIG. 4 and the host vehicle 10.

In certain embodiments, the automated lane change to return to the right lane is commanded if RtLn_VxDiff is greater than the predetermined threshold. In various embodiments, the predetermined threshold comes from a lookup table based on relative distance to right lane object (e.g., a relative distance from the host vehicle 10 to the first target vehicle 410 of FIG. 4).

In various embodiments, when the automated system commands the automatic lane change behind the right lane (e.g., lane 403 of FIG. 4) and the diver overrides this action, then the threshold is automatically increased by the processor.

Conversely, in various embodiments, when the driver commands a lane change manually before the automated system provides for an automated lane change, then the threshold is automatically decreased by the processor.

In addition, in various embodiments, when there are no detected objects in the right lane (e.g., the lane 401 of FIG. 4 in which the host vehicle 10 is traveling), then the processor does not provide any adaptation of the threshold.

In various embodiments, as with the host vehicle lane (e.g., lane 401 of FIG. 4) and the left lane (e.g., lane 402 of FIG. 4), this has now been reversed such that the Vx_Diff is the input to the lookup table and the threshold is compared against the relative distance.

In certain embodiments, monitoring is provided during step 318 for a possible automatic lane change event that would trigger a termination of the temporary change of the temporary back off score of step reset of the back off score. Specifically, in various embodiments, during step 318, the processor 44 makes a determination as to whether an event has occurred that is unrelated to the specific passing window of the host vehicle 10 between the first and second target vehicles 410, 420 of FIG. 4 (e.g., that is irrespective of the relative velocities of the target vehicles with respect to the host vehicle).

For example, in various embodiments, such an event may include one or more of the following, among other possible events: (i) one or more of the target vehicles entering the sensor perception area of the host vehicle 10 with a short time after the driver override (i.e. within a predetermined amount of time after the driver override input); (ii) the driver exiting the roadway (e.g., a highway) a short time after the override (i.e. within a predetermined amount of time after the driver override input); and/or (iii) the driver disabling a lane centering feature for the host vehicle 10 a short time after the override (i.e. within a predetermined amount of time after the driver override input), and so on. In addition, in various embodiments, other exemplary events would include the following: (iv) when the closest in path vehicle is replaced by a slower moving vehicle; (v) when lane change on demand is requested by the driver; (vi) when the host vehicle is exiting a construction zone; (vii) when a change in road features and/or geometry have occurred; (viii) traffic density has change; and/or (ix) when observed lane centering control quality has diminished.

A determination is made as to whether such an automatic lane change event has occurred (step 322). Specifically, in various embodiments, during step 322, a determination is made by the processor 44 of FIG. 1 as to whether such an automatic lane change event described above in connection with step 318 has occurred.

If it is determined in step 322 that such an automatic lane change event has not occurred, then the back off score is maintained (without any reset) at step 325. Specifically, in various embodiments, when no such events occur, the temporary change to the back off score of step 312 or 314 is accepted, and becomes permanent, at step 325. In various embodiments, the process then proceeds to step 326, described further below.

Conversely, if it is instead determined in step 322 that such an automatic lane change event has occurred, then the back off score is reset at step 324. Specifically, in various embodiments, when a reset event occurs, the temporary change to the back off score of step 312 or 314 is disposed of. In various embodiments, the back off reset score is reset by the processor 44 of FIG. 1 so that the timer is equal to the original timer value plus long term growth of the timer value (e.g., corresponding to FIG. 7), but with the short term growth of the timer value (e.g., corresponding to FIG. 6) being reset to zero. Also in various embodiments, the process then proceeds to step 326, described further below.

Figure 9:
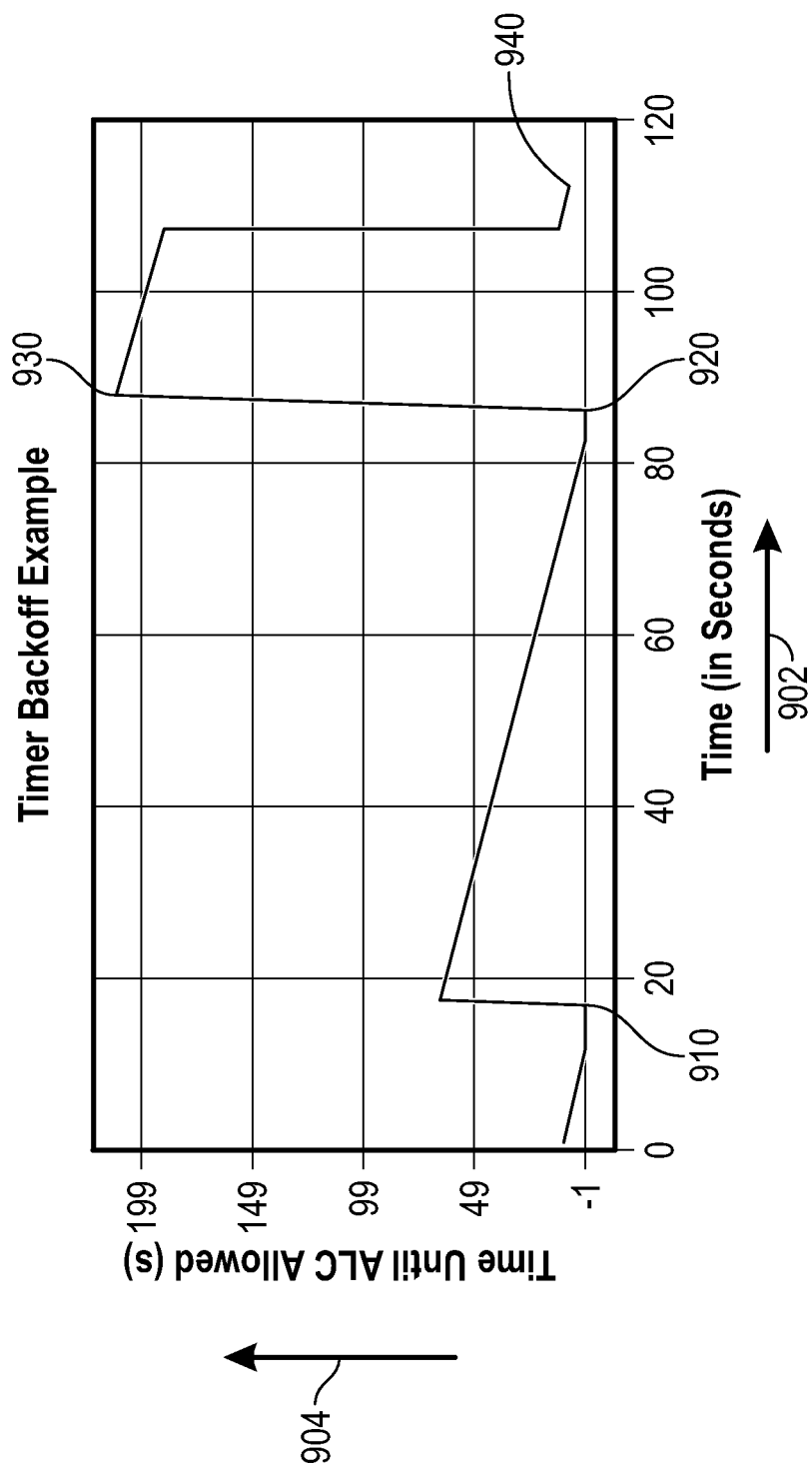
FIG. 9 provides a graphical illustration of an exemplary implementation of a timer back off for automatic override functionality pursuant to the control process of FIG. 3, in accordance with an exemplary embodiment.

With reference to FIG. 9, a graphical illustration of an exemplary implementation of a timer back off for automatic override functionality pursuant to the control process of FIG. 3, including the re-set of step 324, in accordance with an exemplary embodiment. Specifically, in the depicted embodiment of FIG. 9, the x-axis 902 represents time (in seconds), and the y-axis 904 represents a time until an automated overtake command is allowed (in seconds).

As shown in FIG. 9, in an exemplary embodiment, a first driver override occurs at point 910 of FIG. 9. In an exemplary embodiment, at this point 910, the new timer value is equal to the original timer value (e.g., ten seconds) plus a long term growth factor (e.g., one second) plus a short term growth factor (e.g., sixty five seconds). Also in this exemplary embodiment, at point 920, the timer expires, and an overtake is requested. At this point 920, the driver overrides the automated overtake, and accordingly the new timer value is equal to the original timer value (e.g., ten seconds) plus the long term growth factor (e.g. two seconds), plus the short term growth factor (e.g., two hundred seconds). Finally, at point 940, a reset event has occurred (such as the driver's reengagement of a lane centering control for the host vehicle 10), and the new timer value is reset to be equal to the original timer value (e.g., ten seconds) plus the long term growth factor (e.g., two seconds), but without the short term growth factor (due to the reset).

With reference back to FIG. 3, during step 326, a determination is made as to whether the process is continuing in a new iteration (e.g., if the vehicle drive is continuing). In various embodiments, this determination is made by the processor 44 of FIG. 1.

In various embodiments, if it is determined in step 326 that the process is continuing in a new iteration (e.g., that the vehicle drive is continuing), then the process returns to step 304 in a new iteration. Conversely, also in various embodiments, if it is instead determined in step 326 that the process is not continuing in a new iteration (e.g., that the vehicle drive is terminating), then the process terminates at step 328.

Accordingly, in various embodiments, methods and systems are provided for controlling automatic overtake functionality for vehicles based on driver expressed inputs. In various embodiments, the overtake decision criteria is adapting based on driver assertions. Also in various embodiments, adaptive threshold table are used to adapt the overtake algorithm over time based on the driver's expressed preferences. In addition, in various embodiments, the overtake scheduling is also adapted based on the preferences of the driver as determined based on the driver assertions. In addition, also in certain embodiments, a short term exponential back off is utilized along with a long term linear adaptation in order to tune overtake scheduling to driver preferences.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling automatic overtake functionality for a host vehicle, the method comprising:
   obtaining, via a plurality of sensors, sensor data pertaining to the host vehicle and a roadway on which the host vehicle is travelling;
   determining, via a processor, when an automatic overtake is recommended, using the sensor data in conjunction with one or more threshold values;
   receiving driver inputs pertaining to the automatic overtake; and
   adjusting, via the processor, the one or more threshold values for the automatic overtake based on the driver inputs;
   wherein the adjusting of the one or more threshold values comprises adjusting a timer for a delay between recommended overtake actions based on a driver override of one or more of the recommended overtake actions, wherein the adjusting of the timer comprises:

adjusting the timer based on an exponential short term adjustment in response to driver inputs during a current vehicle drive; and adjusting the timer based on a linear long term adjustment in response to driver inputs across multiple vehicle drives; and wherein the method further comprises providing instructions from the processor to one or more vehicle systems including one or more of a propulsion system, a steering system, or a braking system of the host vehicle for selectively executing the automatic overtake based on the adjusted one or more threshold values.

2. The method of claim 1, further comprising:
providing instructions, via the processor, for selectively executing the automatic overtake based on the adjusted one or more threshold values.

3. The method of claim 1, wherein the determining of when the automatic overtake is recommended is based on a relative velocity of one or more target vehicles in proximity to the host vehicle along with a driver set speed for the host vehicle.

4. The method of claim 3, wherein the adjusting of the one or more threshold values comprises adjusting a threshold speed for one or more of the target vehicles based on the driver inputs.

5. The method of claim 1, wherein the adjusting of the one or more threshold values comprises:
increasing the one or more threshold values when a driver overrides a recommended overtake action; and
decreasing the one or more threshold values when the driver initiates a manual request for an overtake action provide to the recommended overtake action.

6. The method of claim 1, wherein the adjusting of the one or more threshold values comprises:
adjusting the one or more threshold values based on an exponential short term adjustment in response to driver inputs during the current vehicle drive; and
adjusting the one or more threshold values based on a linear long term adjustment in response to driver inputs across multiple vehicle drives.

7. The method of claim 6, wherein the adjusting of the one or more threshold values comprises providing a combined adjustment of the one or more threshold values via a summation of the short term adjustment to the threshold values with the linear long term adjustment to the threshold values.

8. The method of claim 7, further comprising:
resetting the short term geometric adjustment to the threshold values when an event occurs that is indicative of a roadway condition that is irrespective of a window between target vehicles in proximity to the vehicle.

9. A system for controlling automatic overtake functionality for a host vehicle, the system comprising:
a plurality of sensors configured to obtain:
sensor data pertaining to the host vehicle and a roadway on which the host vehicle is travelling; and
driver inputs; and
a processor coupled to the plurality of sensors and configured to at least facilitate:
determining when an automatic overtake is recommended, using the sensor data in conjunction with one or more threshold values;
adjusting the one or more threshold values for the automatic overtake based on the driver inputs, by:
adjusting a timer for a delay between recommended overtake actions based on a driver override of one or more of the recommended overtake actions, wherein the adjusting of the timer is based on both:
an exponential short term adjustment in response to driver inputs during a current vehicle drive; and
a linear long term adjustment in response to driver inputs across multiple vehicle drives; and
providing instructions to one or more vehicle systems including one or more of a propulsion system, a steering system, or a braking system of the host vehicle for selectively executing the automatic overtake based on the adjusted one or more threshold values.

10. The system of claim 9, wherein the processor is configured to at least facilitate recommending the automatic overtake based on a relative velocity of one or more target vehicles in proximity to the host vehicle along with a driver set speed for the host vehicle.

11. The system of claim 10, wherein the processor is configured to at least facilitate adjusting a threshold speed for one or more of the target vehicles based on the driver inputs.

12. The system of claim 9, wherein the processor is configured to at least facilitate adjusting the one or more threshold values by:
increasing the one or more threshold values when a driver overrides a recommended overtake action; and
decreasing the one or more threshold values when the driver initiates a manual request for an overtake action provide to the recommended overtake action.

13. The system of claim 9, wherein the processor is configured to at least facilitate adjusting the one or more threshold values by:
adjusting the one or more threshold values based on a short term exponential adjustment in response to driver inputs during the current vehicle drive; and
adjusting the one or more threshold values based on a long term linear adjustment in response to driver inputs across multiple vehicle drives.

14. The system of claim 13, wherein the processor is configured to at least facilitate the adjusting of the one or more threshold values by providing a combined adjustment of the one or more threshold values via a summation of the short term exponential adjustment with the long term linear adjustment.

15. The system of claim 9, wherein the processor is further configured to at least facilitate providing instructions for selectively executing the automatic overtake based on the adjusted one or more threshold values.

16. A vehicle comprising:
a propulsion system;
a steering system;
a braking system;
a plurality of sensors configured to obtain:
sensor data pertaining to the vehicle and a roadway on which the vehicle is travelling; and
driver inputs; and
a processor coupled to the plurality of sensors and configured to at least facilitate:
determining when an automatic overtake is recommended, using the sensor data in conjunction with one or more threshold values;
adjusting the one or more threshold values for the automatic overtake based on the driver inputs, by:
adjusting the one or more threshold values based on a short term exponential adjustment in response to driver inputs during a current vehicle drive;

adjusting the one or more threshold values based on a long term linear adjustment in response to driver inputs across multiple vehicle drives;

adjusting of the one or more threshold values by providing a combined adjustment of the one or more threshold values via a summation of the short term exponential adjustment with the long term linear adjustment; and providing instructions for the propulsion system, the steering system, and the braking system for selectively executing the automatic overtake based on the adjusted one or more threshold values.

* * * * *